(No Model.) 2 Sheets—Sheet 2.
W. HABERSANG & F. ZINZEN.
METAL DRILLING MACHINE.
No. 514,990. Patented Feb. 20, 1894.
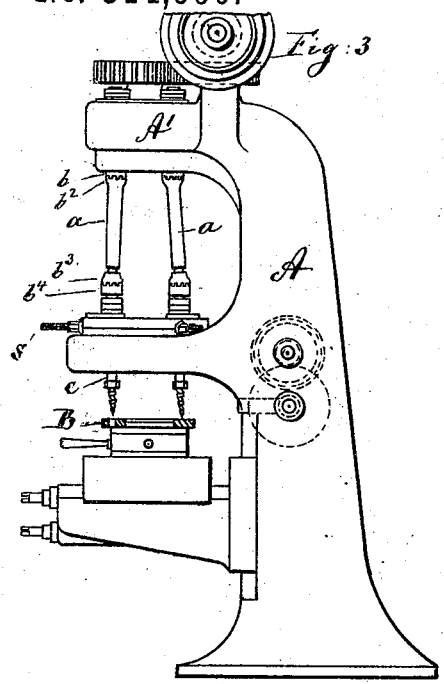
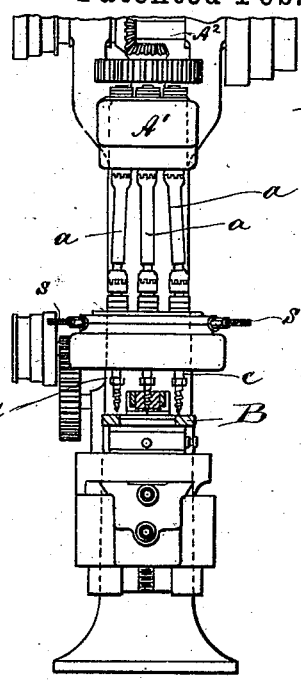
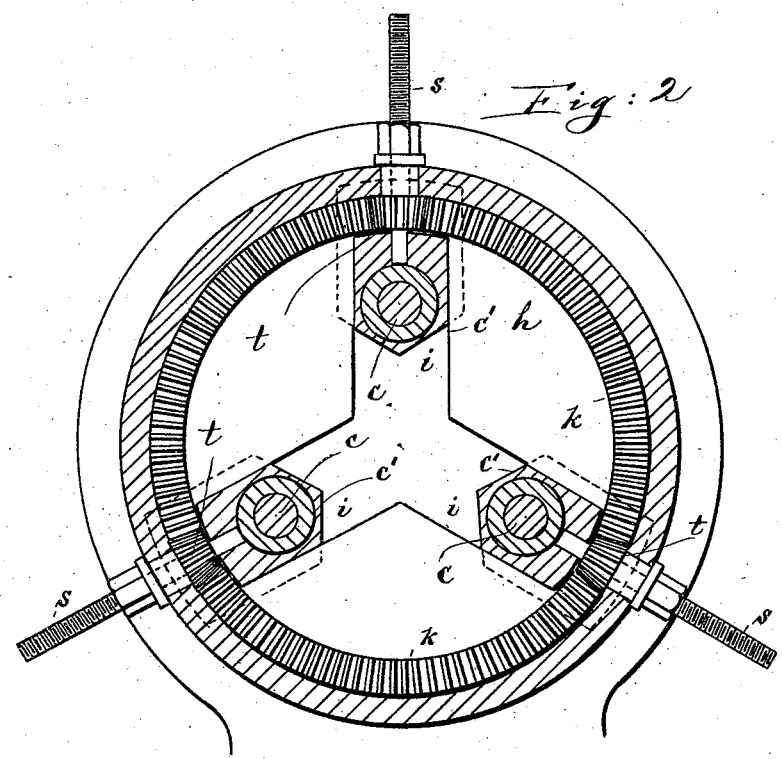
Witnesses
Wm. Schulz
A. Jonghmans.
Inventors:
W. Habersang &
F. Zinzen per
Roeder & Briesen, attys.

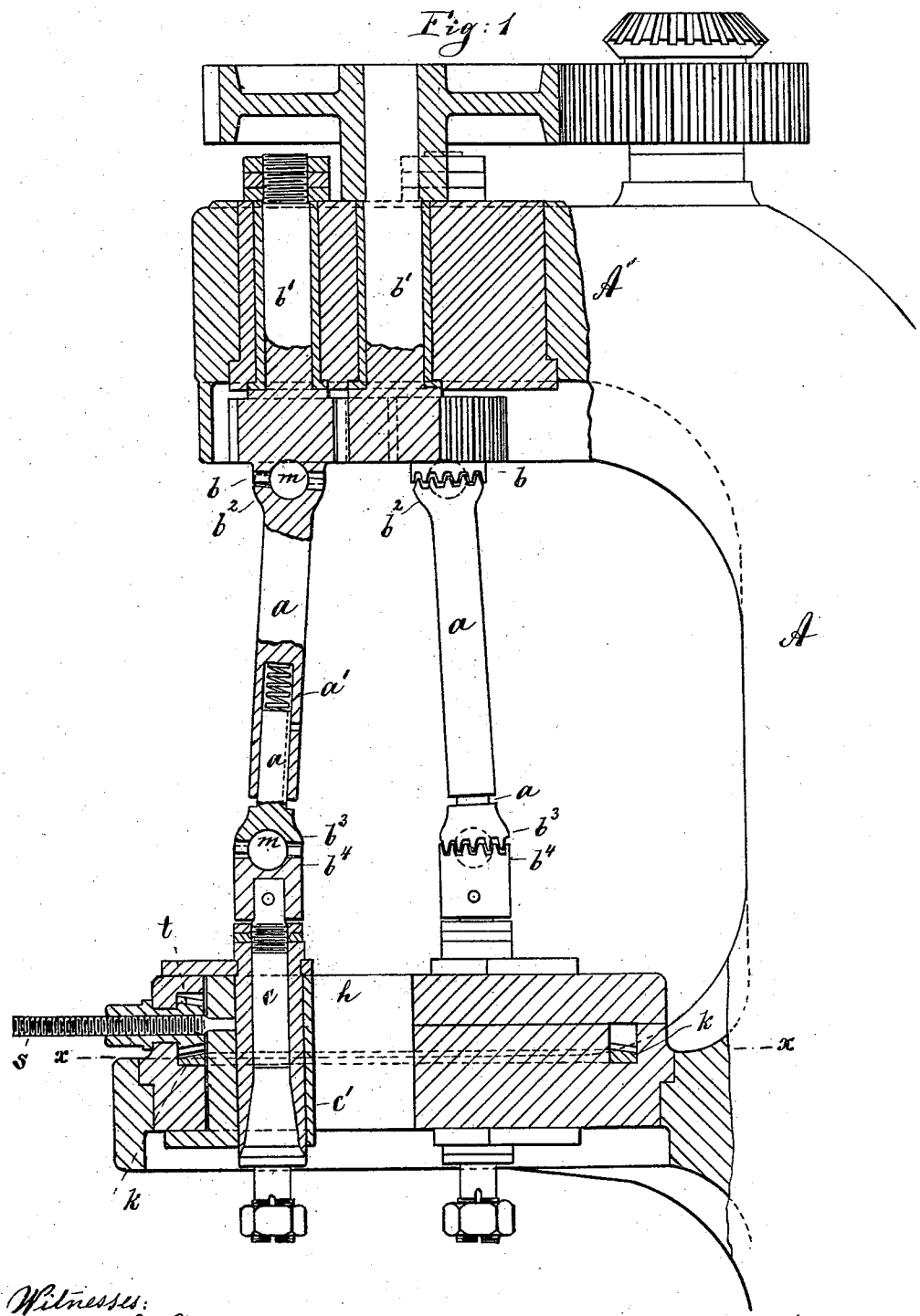

UNITED STATES PATENT OFFICE.

WILHELM HABERSANG AND FRITZ ZINZEN, OF DUSSELDORF, GERMANY.

METAL-DRILLING MACHINE.

SPECIFICATION forming part of Letters Patent No. 514,990, dated February 20, 1894.

Application filed December 11, 1891. Serial No. 414,675. (No model.)

*To all whom it may concern:*

Be it known that we, WILHELM HABERSANG and FRITZ ZINZEN, subjects of the German Emperor, residing at Dusseldorf, Germany, have invented certain new and useful Improvements in Metal-Drilling Machines, of which the following is a specification.

This invention relates to a machine more particularly designed for simultaneously boring several holes into a metal tube flange. The boring shafts may be inclined to reach flanges of different diameters and the tools are guided in radially adjustable bearings, all as hereinafter more fully pointed out.

In the accompanying drawings: Figure 1 is a vertical longitudinal section of the upper part of the machine; Fig. 2 a cross section on line $x$, $x$, Fig. 1. Figs 3 and 4 are side and front elevations of the machine on a reduced scale.

The letter A, represents the frame of the machine having an upper cross head A', that is perforated for the revolving shaft $b'$, of clutches $b$. These shafts receive their motion by a suitable train of gearing from the work shaft $A^2$. The clutches $b$, engage corresponding clutches $b^2$, on the upper ends of the boring shafts $a$, so that a coupling is formed that permits the shafts which are arranged in a circle to be inclined outward or inward to any desired angle. The shafts $a$, when inclined outward must, of course, be lengthened, and to this effect the shafts are made in two telescoping sections with an intervening spring $a'$. The lower section carries a clutch $b^3$, similar to the upper clutch and adapted to connect the shaft by clutch $b^4$, to the boring tool holder $c$. The boring tool holders pass through sliding bearings $c'$, free to move inwardly or outwardly in radial ways $i$, of a disk $h$. To simultaneously and uniformly move the tools, the bearings $c'$, are provided with screw shafts $s$, engaged by tapped bevel cog wheels $t$. These wheels are in turn geared with a large circular bevel gear wheel $k$. If one of the wheels $t$, is revolved, the other wheels $t$, will thus be simultaneously revolved and the boring tools will be thrown inward or outward to a uniform extent. Thus the machine can be readily set to operate on work of different diameters.

In order to permit free tilting of the shafts and still cause the rotary motion to be properly transmitted, the clutches are constructed in the following manner: The two adjoining ends of the shafts are enlarged to form sockets and provided with a central circular chamber for the reception of a ball $m$. Upon this ball, the tilting of the shaft takes place. Around the ball, the sockets are provided with interlocking serrations or fingers, which cause the rotary motion of one socket to be transmitted to the other socket.

In use, the tools are first set by means of their sliding bearings so as to reach the work B, (Fig. 3) and then the boring shafts are revolved to drill the holes.

What we claim is—

The combination of jointed boring shafts having ball bearings, with tool holders secured to the shafts, sliding bearings engaging the tool holders, a disk engaging the sliding bearings and with cog wheels $t$, gear wheel $k$, and screws $s$, operated by the wheels $t$, and $k$, substantially as specified.

In testimony whereof we have signed this specification in the presence of two subscribing witnesses.

WILHELM HABERSANG.
FRITZ ZINZEN.

Witnesses:
 AUG. V. PAPEN,
 THEODOR MAYER.